INVENTORS C.G. DAVIS
L.C. THOMAS
BY Leonard M. Arnold
ATTORNEY

DATA TRANSMISSION

Filed May 3, 1963 2 Sheets-Sheet 2

3,281,527
Patented Oct. 25, 1966

3,281,527

DATA TRANSMISSION

Claude G. Davis, Colts Neck, and Lewis C. Thomas, North Plainfield, N.J., assignors to Bell Telephone Laboratories, Incorporated, New York, N.Y., a corporation of New York Filed May 3, 1963, Ser. No. 277,814
4 Claims. (Cl. 178—3)

This invention relates to data transmission and more particularly to the transmission of binary data on a pulse transmission system employing self-timed regenerative repeaters.

The pulse transmission system described in the January 1962 issue of the Bell System Technical Journal by C. G. Davis in "An Experimental Pulse Code Modulation System for Short Haul Trunks," pages 1–24 and J. S. Mayo in "A Bipolar Repeater for Pulse Code Modulation Signals," pages 25–97, appears to be ideally suited for the transmission of data from one source, such as a data tape, to a distant store or utilization device; since it transmits information in digital form. Such transmission is not easily accomplished, however, since the transmission system employs, for retiming the transmitted signal, regenerative repeaters that are self timed in the sense that they derive their clock signals from the transmitted signal itself. In order to successfully derive this clock signal at each repeater a marking or ON pulse must be received at least once every fifteen time slots, and any lapse in transmission for a greater period renders the system inoperative.

Under known techniques it is not possible to avoid this lapse in transmission. The standard data tape currently in use employs seven tracks of information so that seven-bit characters of data appear in parallel across the tape. The speed of the tape is quoted in terms of characters per second and the maximum speed presently obtainable with commerically available equipment is approximately 62.5 kilocharacters per second, the serial transmission of which requires a pulse repetition rate of 437.5 kilobits per second. This speed is not constant, however, and the speed at which data are read off the tape may be considerably less due to acceleration and deceleration of the tape as well as stretching or twisting of the tape. The pulse repetition rate of the above-mentioned transmission system is 1.544 megabits per second, which is more than twice that of the fastest available tape equipment. While buffer storage systems are known which are capable of transferring data from a tape operating at one speed to a device operating at a second and higher speed these systems are capable only of transferring blocks of data at the higher speed with substantial time gaps between the transfer of data. Since the above-mentioned transmission system operates at more than twice the pulse repetition rate of the fastest available tape equipment such techniques cannot be employed since the resulting time gaps introduced in the signals applied to the transmission system would render its repeaters inoperative.

It is an object of this invention to transmit binary data from a source, such as a data tape, to a utilization device, such as a store, or data tape, over a regenerative pulse transmission system employing self-timed regenerative repeaters.

In accordance with this invention binary data appearing on a data tape are transmitted over a regenerative pulse transmission system having a pulse repetition rate higher than that at which the data can be read from the tape by transmitting a predetermined pulse pattern until a register is stored with incoming data, transmitting a predetermined start signal indicating that data are to follow, and then reading out the stored data at the pulse repetition rate of the transmission system and transmitting it over the system. At the receiver, in response to the reception of the start signal the data are stored and, in response to the reception of the last bit of data in a given character, are read out. In a preferred embodiment of the invention a continuous train of marking or ON pulses is transmitted until a data character has been stored at which time the transmission of marking pulses is interrupted for one time slot. The resulting space, or OFF pulse, is utilized as a start signal to inform the receiver that data pulses are to be transmitted in the following time slots. By transmitting continuously recurring marking or ON pulses until a data character has been stored the proper operation and timing of the self-timed repeaters of the system are insured since at least one marking or ON pulse will occur every fifteen time slots.

This invention will be more fully comprehended from the following detailed description of a preferred embodiment thereof taken in conjunction with the appended drawings, in which.

The pulse transmission system decribed in the above-mentioned article in the January 1962 issue of the Bell System Technical Journal operates at a speed of 1.544 megabits per second and employs clock signal generators at each of its terminals to generate marking or ON pulses at that frequency. As contemplated by this invention, the principal use for data transmission over such a system would be in the field of transferring data from one data tape to another data tape at a distant location. Generally, seven-bit characters of binary data are recorded in parallel across the data tape with each bit comprising either a marking pulse or a space. A marking or ON pulse is the presence of a relatively high voltage level, while a space is the absence of a pulse (i.e., OFF pulse) or the presence of a relatively low voltage level.

Figure 1:
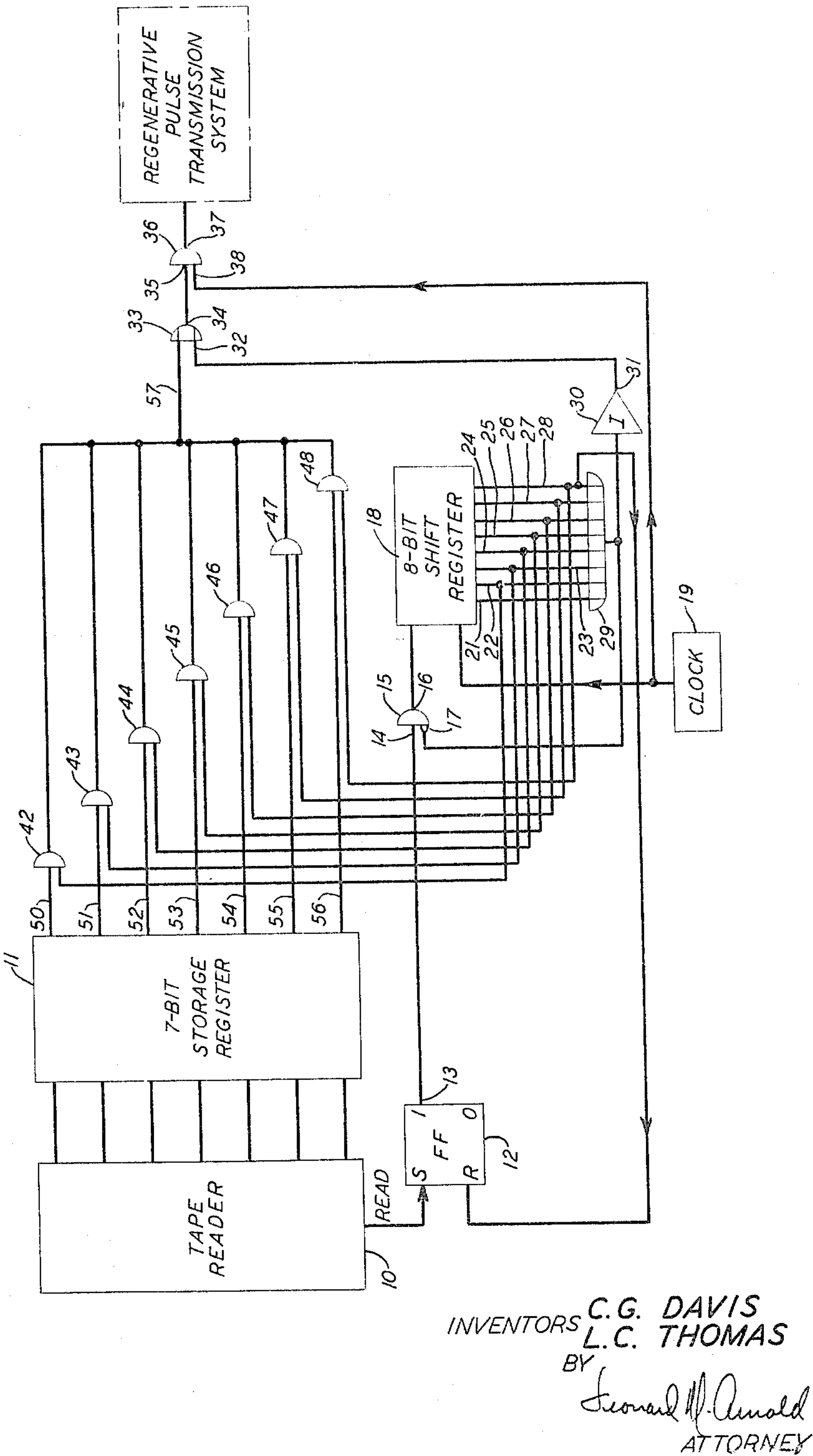
FIG. 1 is the transmitter of a data transmission system embodying the invention.

The data are read from the data tape by a data tape reader 10, shown in block form in FIG. 1, which has seven output terminals at which appear the seven bits which make up a data character. These seven bits of data are applied to a seven-bit storage register 11 and when the data have been so applied the reader 10 generates a read signal to set a multivibrator or flip-flop circuit 12. The multivibrator or flip-flop 12 has set and reset terminals respectively designated "S" and "R" and two output terminals designated "1" and "0." The application of a read signal to the S-input sets the multivibrator 12 with its 1-output established at a relatively high voltage level and its 0-output established at a relatively low output voltage level. The application of a high voltage level signal to the R-input resets the multivibrator so that it assumes the reverse conditions.

The resulting high voltage level at the 1-output terminal 13 is applied to the input terminal 14 of an INHIBIT gate 15 which, in the absence of a high voltage level at its inhibitor terminal 17, produces a high level output voltage at its output terminal 16. Thus when the seven-bit storage register 11 has stored a data character, a high voltage level appears at terminal 16 of gate 15. This high voltage level is applied to the input terminal of an eight-bit shift register 18 whose shifting is controlled by a 1.544 megabit per second clock source 19 which is one of the clock signal generators found at each terminal of the above-mentioned pulse transmission system. In response to the high voltage level at terminal 16 of gate 15, therefore, the shift register produces eight marking pulses, at its output terminals 21 through 28, which pulses sequentially appear during eight time slots of the pulse transmission system.

The first resulting marking pulse appearing at output terminal 21 of register 18 is applied through an OR gate 29 to the input terminal of a NOT or inverter circuit 30. The application of a marking pulse to the input of NOT gate 30 results in a low voltage level signal being generated at its output terminal 31. Output terminal 31 is connected to one input terminal 32 of an OR gate 33 and the presence of a low voltage level signal at input terminal 32 serves to close OR gate 33 so that a low voltage level signal appears at its output terminal 34. The output terminal 34 of gate 33 is connected to one input terminal 35 of an AND gate 36 and the application of the low voltage level signal to terminal 35 produces a corresponding low voltage level signal at output terminal 37 of AND gate 36. As a result a space, or a low voltage level signal, is transmitted over the regenerative pulse transmission medium to which the output terminal 37 of gate 36 is connected. Thus during the first time slot after the generation of a read signal by reader 10, indicating that storage register 11 is full, a space or low voltage level signal is transmitted over the transmission system.

During the time before the storage register 11 was filled with data a low voltage level signal was present on all output terminals 21 through 28 of register 18 and a low voltage level signal was applied to NOT gate 30. As a result a relatively high voltage level was produced by NOT gate 30 which was applied to input terminal 35 of AND gate 36 through OR gate 33. The second input terminal 38 of AND gate 36 is connected to the 1.544 clock source 19 of marking pulses and as a result of the simultaneous application of these two input signals to AND gate 36 continuously recurring output marking pulses were applied to the transmission system at the 1.544 megabit per second rate of the transmission system. In this way continuously recurring marking pulses are applied to the transmission system to maintain the self-timed repeaters in operation during all times in which data are not being read out of register 11 either because none is being applied thereto or because the store is not full.

As described above, continuously recurring marking pulses are transmitted over the transmission system until register 11 is filled with a data character. When a read signal is generated by reader 10 a space or low voltage level signal, which may be called a start signal, is transmitted over the system indicating to the receiver that data is to follow. In other words, by the interruption for one time slot of the continuous marking pulses that are transmitted during the idle period, a start signal is transmitted to the receiver to inform it that information data are about to be transmitted. Each of the seven output terminals 22 through 28 of shift register 18 is connected to an input terminal of a respective one of the AND gates 42 through 48. The second input terminal of each of AND gates 42 through 48 is connected to a respective one of the output terminals 50 through 56 of register 11. Since register 11 is filled with data and each AND gate 42 through 48 is sequentially actuated during the seven succeeding time slots after the transmission of a start space, the digits making up a data character are applied in serial fashion to input terminal 57 of OR gate 33 and to input terminal 35 of AND gate 36. Since input terminal 38 of AND gate 36 is connected to the 1.544 megabit per second clock source the rate at which the data are transmitted is positively tied to the 1.544 megabit rate of the transmission system.

During the period of eight time slots established by register 18, NOT gate 30 produces a relatively low voltage level signal since the marking pulses, or high voltage level signals, generated by the shift register are applied to the NOT gate 30 through OR gate 29. As a result the only path to the input of the transmission system is through input terminal 57 of OR gate 33 and AND gate 36. Additional marking pulses, or high voltage level signals, are also prevented from being started through the shift register 18 during this time interval by applying the output of OR gate 29 to inhibitor terminal 17 of gate 15 which reduces the output voltage level at terminal 16 after the generation of a marking pulse at terminal 21 of shift register 18. Output terminal 28 of shift register 18 is also connected to the "R" terminal of multivibrator 12 to reset the multivibrator after the transmission of a data character, and to prepare the circuitry for the transmission of more data.

Figure 3:
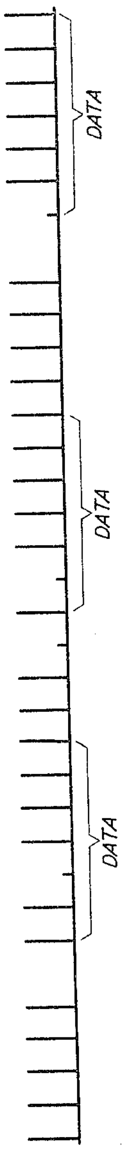
FIG. 3 illustrates a typical signal to be transmitted over the pulse transmission system.

Thus, in accordance with this invention continuously recurring marking pulses are applied to the transmission system until a data character is stored in register 11. By transmitting such marking pulses at the pulse repetition rate of the transmission system the proper operation of the self-timed repeaters is insured. When a full character of data has been stored a start space, or low voltage level signal, is transmitted in the next occurring time slot of the transmission system to indicate that the transmission of data is to follow in the immediately succeeding seven time slots. After this period of eight time slots, continuously recurring marking pulses are again transmitted until another data character has been stored. An illustration of the resulting signal train is shown in FIG. 3.

Figure 2:
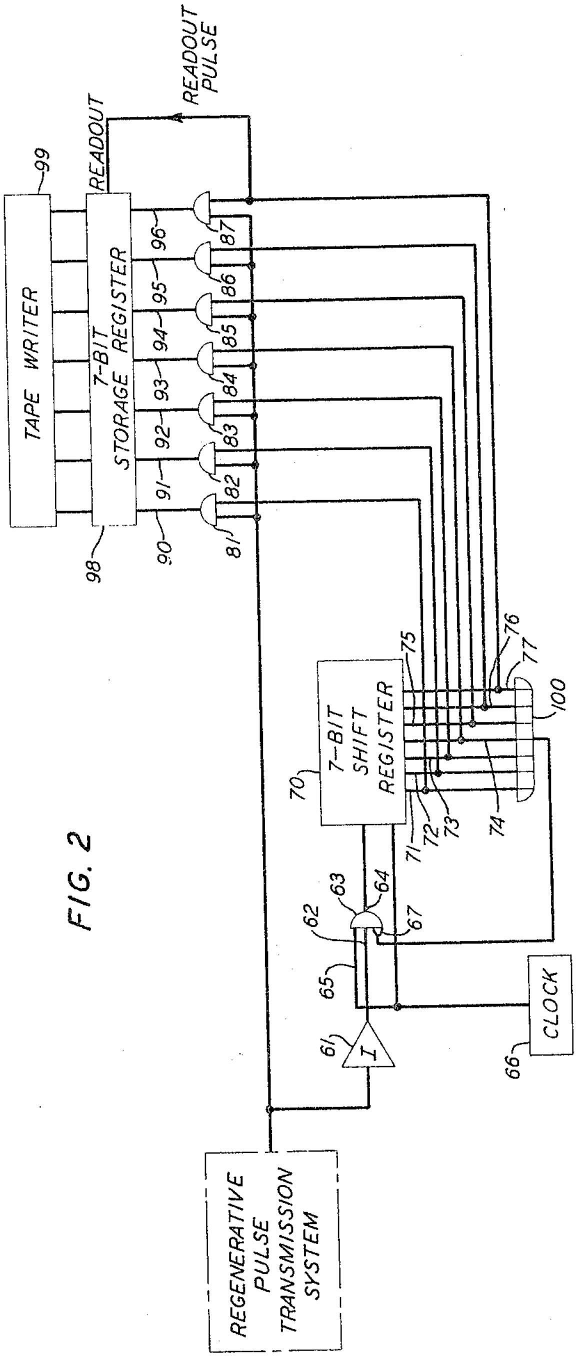
FIG. 2 is the receiver of a data transmission system embodying the invention.

At the output of the transmission system, shown in FIG. 2, the reception of continuously recurring marking pulses does not activate the circuitry. Each of the continuously recurring marking pulses is applied to a NOT gate or inverter circuit 61 which produces a low voltage level signal in response thereto. The resulting low voltage level signal is applied to input terminal 62 of INHIBIT gate 63 which produces a low voltage level signal at its output terminal 64. This low voltage level signal does not activate shift register 70 and as a result none of the remaining circuitry is actuated.

Upon the transmission of a start space, or low voltage level signal, however, NOT gate 61 produces a high voltage level signal which is applied to input terminal 62 of INHIBIT gate 63. The second input terminal 65 of gate 63 is connected to a source 66 of 1.544 megabit per second clock marking pulses so that in the absence of a high voltage level signal at inhibitor terminal 67 a high voltage level signal is produced at output terminal 64 of gate 63 and applied to a seven digit shift register 70 whose shifting is controlled by the source 66. As a result, in the seven time slots immediately succeeding the reception of a start space indicating the data are to follow, shift register 70 produces seven sequentially appearing marking pulses, or high voltage level signals, which appear at terminals 71 through 77 in that order.

Each of the seven output terminals 71 through 77 of register 70 is connected to an input terminal of a respective one of the AND gates 81 through 87, so that AND gates 81 through 87 are sequentially actuated during the seven time slots immediately succeeding the arrival of a start space. It is precisely during these seven time slots established by register 70 that the data are transmitted and, as a result, the data are applied to and transmitted through the AND gates with gate 81 transmitting the data transmitted in the first such time slot, gate 82 transmitting the data transmitted in the second time slot, and so forth. The output terminals 90 through 96 of the gates 81 through 87, respectively, are connected to the input terminals of a storage register 98 with the result that the data transmitted are stored in the register 98. The data are read out of the register 98 to a tape writer 99 in response to the marking pulse appearing on terminal 77 of register 70 which pulse appears when the data has been stored in register 98. Tape writer 99 applies the data to a data tape.

During the period of transmission of the data no pulses can be inserted into register 70 because each marking pulse, or high voltage level output signal, of register 70 is sent back through OR gate 100 to inhibitor terminal 67 of INHIBIT gate 63 at the input of the shift register. As a result during the transmission of data a low voltage level signal appears at output terminal 64 of gate 63 and the transmission of a data space cannot start another pulse through the shift register 70.

The tape reader 10 and writer 99 may be that described in International Business Machines Customer Engineering Reference Manual, Tape Adapter Unit, January 1961, copyright 1961, by International Business Machines Corporation. An appropriate storage register is shown in United States Patent 2,282,305, issued to B. L. Havens et al. on February 19, 1956, and the shift register may be that shown in United States Patent 2,788,443 issued to E. O. Rulig on April 9, 1957. The INHIBIT gates may be those described on page 403 of "Pulse and Digital Circuits" by Millman and Taub, published by the McGraw-Hill Book Company, 1956, while the NOT circuits or inverter circuits may be those shown on page 401 of that text.

Thus in accordance with this invention data from a data tape are processed so that they may be transmitted over a regenerative pulse transmission system employing self-timed repeaters. Since marking pulses are applied to the transmission system at the pulse repetition rate of the transmission system when data is not being transmitted at least one marking pulse is transmitted every fifteen time slots and the proper operation of the self-timed repeaters of the transmission system is insured.

It is to be understood that the above-described arrangements are illustrative of the application of the principles of the invention. Numerous other arrangements may be devised by those skilled in the art without departing from the spirit and scope of the invention.

What is claimed is:

1. In combination, a synchronous regenerative pulse transmission system employing self-timed repeaters, a source of data having a pulse repetition rate which is nonsynchronous with respect to the pulse repetition rate of said synchronous transmission system, means connected between the input of said transmission system and said source to transmit continuously recurring marking pulses at the pulse repetition rate of said transmission system until a predetermined quantum of data has been received from said suorce, means connected between the input of said system and said source to transmit a space after said quantum of data has been received from said source and to transmit said data after the occurrence of said space at the pulse repetition rate of said transmission system comprising, data storage apparatus to store said data, a shift register, means to apply a high voltage level signal to said shift register after said predetermined quantum of data has been received from said source and stored in said store, means to shift said applied high voltage level signal through said shift register so that $n+1$ marking pulses are sequentially produced at $n+1$ output terminals of said register, where $n$ is a positive integer equal to the number of data bits in said predetermined quantum of data, at a rate equal to the pulse repetition rate of said system, means responsive to the marking pulse output signal from the first of said $n+1$ register output terminals at which a marking pulse appears to transmit a space over said transmission system, gating means responsive to said marking pulses sequentially appearing at said second through $n+1$th register output terminals to transmit said stored data in the next occurring $n$ time slots of said pulse transmission system, means at the output of said system responsive to said transmitted space to store said received data, and mans at the output of said system to read said data out of said store.

2. Apparatus in accordance with claim 1 wherein said means at said output of said system comprises, in combination, means to detect a first transmitted space after the transmission of continuously recurring marking pulses to generate a high voltage level signal in response thereto, a shift register having $n$ output terminals, where $n$ is the number of data bits in said predetermined quantum of data, at which sequentially appear $n$ output marking pulses in response to said high voltage level signal generated in response to said first space, gating means, means connecting said $n$ output terminals of said shift register to the input of said gating means, means connecting said transmission system to the input of said gating means, an $n$ bit storage register connected to the output of said gating means so that said received data is stored in said storage register, and means responsive to the last of said $n$ sequentially appearing output marking pulses from said shift register to read said stored data out of said storage register.

3. Apparatus in accordance with claim 1 wherein said means at said output of said system comprises, in combination, a NOT gate to convert said first transmitted space after the transmission of continuously recurring marking pulses to a high voltage level signal, a shift register having an input terminal, $n$ output terminals, where $n$ is a real positive integer equal to the number of data bits in said predetermined quantum of data, and a control terminal at which applied marking pulses control the shifting of said register, gating means connecting said NOT gate to the input terminal of said shift register, a source of clock marking pulses connected to said control terminal of said shift register so that $n$ output pulses appear sequentially at said $n$ output terminals of said shift register in response to the occurrence of said first transmitted space, $n$ AND gates each having two input terminals, one input terminal of each of said AND gates being connected to a respective one of said $n$ output terminals of said shift register and the other of said input terminals being connected to the output of said transmission system so that during the $n$ time slots during which said shift register generates output marking pulses data are transmitted through said AND gates, a storage register connected to the output terminals of said AND gates to store said data, and means responsive to the last of said sequentially generated shifted register output marking pulses to read said stored data out of said storage register.

4. In combination, a synchronous regenerative pulse transmission system employing self-timed repeaters, a source of data having a pulse repetition rate which is nonsynchronous with respect to the pulse repetition rate of said synchronous transmission system, means connected between the input of said transmission system and said source to transmit continuously recurring marking pulses at the pulse repetition rate of said transmission system until a predetermined quantum of data has been received from said source and to transmit a space after said quantum of data has been received and then transmit said data after the occurrence of said space comprising, a storage register having $n$ output terminals, where $n$ is a positive integer equal to the number of data bits in said predetermined quantum of data, to store said received data, a shift register having $n+1$ output terminals, a clock source to generate marking pulses at the pulse repetition rate of said transmission system connected to said shift register to govern the shifting of said shift register, first gating means to apply a high voltage level signal to said shift register when said storage register is filled with data so that $n+1$ output marking pulses are sequentially produced at said $n+1$ output terminals of said shift register at a rate equal to the pulse repetition rate of said transmission system, a NOT gate connected to the first of said $n+1$ output terminals of said shift register at which a marking pulse is first generated in response to said applied high voltage level signal from said first gating means to generate a low voltage level signal, second gating means to apply said low voltage level signal generated by said NOT gate to said transmission system, an OR gate connected to said $n+1$ output terminals of said shift register and having its output terminal connected to said first gating means to inhibit said first gating means from applying a high voltage level signal to said shift register during the generation of the 2nd through $n+1$th marking output pulses by said shift register, $n$ AND gates each having two input terminals, means connecting one input terminal of each of said AND gates to an output terminal of a respective one of said 2nd through $n+1$th output terminals of said shift register, means connecting the second input terminal of each AND gate to a respective one of the output terminals of said storage register so that the data is read out of said storage register in response to the generation of the 2nd through $n+1$th marking pulses by said shift register, means connecting the output terminals of said AND gates to said second gating means to transmit said stored data during the next occurring $n$ time slots following the transmission of a low voltage level signal, means connecting said clock source to said second gating means to apply marking pulses from said clock source to said transmission system when data is not stored in said source, means at the output of said system responsive to said transmitted space to store said received data, and means at the output of said system to read said data out of said store.

References Cited by the Examiner

UNITED STATES PATENTS 2,833,858 5/1958 Grondin ------------ 178—70

NEIL C. READ, *Primary Examiner.*

ROBERT H. ROSE, *Examiner.*

A. J. DUNN, T. A. ROBINSON, *Assistant Examiners.*